United States Patent Office 3,732,116
Patented May 8, 1973

3,732,116
GLASS-CERAMIC ARTICLES CONTAINING STRONTIA-, YTTRIA-, LANTHANA-, AND/OR TANTALA-BEARING CRYSTAL SPECIES
Richard F. Reade, Corning, N.Y., assignor to Corning Glass Works, Corning, N.Y.
No Drawing. Filed Oct. 21, 1970, Ser. No. 82,844
Int. Cl. C03c 3/22
U.S. Cl. 106—39.7  1 Claim

ABSTRACT OF THE DISCLOSURE

This invention relates to the production of glass-ceramic articles exhibiting very low coefficients of thermal expansion and excellent resistance to creep at temperatures up to 1000° C. More specifically, this invention is concerned with glass-ceramic articles containing beta-spodumene solid solution as the principal crystal phase which are crystallized in situ from glass compositions in the $Li_2O$-$Al_2O_3$-$SiO_2$ field but which also contain minor, but necessary, amounts of SrO, $Y_2O_3$, $La_2O_3$, and/or $Ta_2O_5$.

---

Glass-ceramic or semicrystalline ceramic articles, as such have been variously denominated, are produced through the controlled crystallization in situ of a glass article. Hence, the manufacture of glass-ceramic articles involves three primary steps: first, a glass-forming batch is compounded to which a nucleating agent is normally admixed; second, the batch is fired to a homogeneous melt and the melt simultaneously cooled and a glass article of a desired configuration shaped therefrom; and, third, the glass article is heat treated according to a particular time-temperature schedule whereby nuclei are initially developed in the glass which provide sites for the growth of crystals thereon as the heat treatment proceeds.

Inasmuch as the crystallization is effected through the essentially simultaneous growth on innumerable nuclei, the structure of a glass-ceramic article comprises relatively uniformly-sized, fine-grained crystals homogeneously dispersed in a glassy matrix, these crystals constituting the predominant proportion of the article. Consequently, glass-ceramic articles are frequently defined as being at least 50% by weight crystalline and, in many instances, are actually greater than 75% by weight crystalline. As the result of this very high crystallinity, the chemical and physical properties of glass-ceramic articles are commonly materially different from those of the parent glass and are more closely allied to those exhibited by the crystals. Finally, the residual glassy matrix will have far different composition from that of the parent glass, since the crystal components will have been precipitated therefrom.

U.S. Pat. No. 2,920,791, the basic patent in the field of glass-ceramics, provides an extensive examination of the practical aspects and theoretical considerations involved in the production of such articles as well as a study of the crystallization mechanism and reference is made thereto for a further explanation of the factors.

As will readily be recognized, the crystal phases developed in glass-ceramic articles are primarily dependent upon the composition of the parent glass although, because of the fact that a glass-ceramic inherently bespeaks of non-equilibrium conditions, metastable crystal phases can frequently be produced therein through control of the heat treatment applied thereto which could not be developed under the conventional equilibrium conditions represented in the classical phase diagram. The compositions of this invention are founded upon the $Li_2O$-$Al_2O_3$-$SiO_2$ system which, when nucleated with $TiO_2$ or $TiO_2 + ZrO_2$ will crystallize in situ yielding beta-spodumene solid solution as by far the principal crystal phase, but which also contain minor additions of large modifier ions designed to produce additional crystal phases.

The ternary beta-spodumene solid solution-containing glass-ceramic articles demonstrate the highly desirable properties of low coefficient of thermal expansion and high viscosity at elevated temperatures. However, such bodies require extreme care when crystallized in situ in thick cross-section to avoid cracking. Cracking is caused by the stress differentials set up in the body as the initial crystal phase formed at lower temperatures, beta-eucryptite solid solution, crystallizes and then transforms to beta-spodumene solid solution as the temperature of the heat treatment is raised. The residual glassy phase (highly siliceous) is sufficiently viscous at the crystallization temperatures to impede adequate flow for stress release such that cracking may result.

The primary object of this invention is to provide means for decreasing the viscosity of the residual glassy phase during the initial crystallization sequence to eliminate the hazard of cracking, but wherein the final glass-ceramic article will exhibit an excellent combination of low coefficient of thermal expansion and high temperature dimensional stability (creep resistance).

I have discovered that certain glasses in the $Li_2O$-$Al_2O_3$-$SiO_2$ composition field which also contain minor amounts of at least one metal oxide selected from the group consisting of SrO, $Y_2O_3$, $La_2O_3$, and $Ta_2O_5$, when nucleated with $TiO_2$ or $TiO_2 + ZrO_2$ can be crystallized in situ to yield glass-ceramic articles consisting essentially of beta-spodumene solid solution in a residual glassy matrix but wherein very minor amounts of crystal phases containing the above-recited metal oxides are also present. Since the creep behavior of a glass-ceramic material is strongly influenced by the amount and nature of the residual glassy phase present, the ability of these large ions to themselves enter the crystallization process, thus decreasing the amount of residual glassy phase while maintaining a low thermal expansion, is a highly desirable feature.

In its broadest terms, my invention comprises melting a batch for a thermally crystallizable glass consisting essentially, by weight on the oxide basis, of about 65–75% $SiO_2$, 15–20% $Al_2O_3$, 3–6% $Li_2O$, 1–6% total of at least one metal oxide in the stated proportions selected from the group consisting of 1–4% SrO, 1–4% $Y_2O_3$, 1–5% $La_2O_3$, and 1–5% $Ta_2O_5$, and 2–7% $RO_2$, wherein $RO_2$ consists of 2–6% $TiO_2$ and 0–3% $ZrO_2$, simultaneously cooling the melt at least below the transformation range thereof and shaping a glass article therefrom, and thereafter heating the glass article to a temperature between about 1000°–1200° C. for a sufficient length of time to secure a very highly crystalline body.

The transformation range is that temperature at which a liquid melt is deemed to have been transformed into an amorphous solid; this temperature commonly being defined as lying between the strain point and the annealing point of a glass. Inasmuch as crystallization in situ is a process dependent upon both time and temperature, it can readily be appreciated that at temperatures within the hotter extreme of the heat treating range brief dwell periods only will be required, e.g., ¼ hour or even less; whereas, in the cooler extreme of the heat treating range, hold times as long as 24 hours may be necessitated to achieve high crystallinity.

In general, the heat treatment has two principal functions: (1) to provide good nucleation such that (2) a highly-crystalline, fine-grained glass-ceramic article will be produced upon further heating. Nucleation is commonly undertaken at temperatures somewhat above the transformation range, i.e., between about 750°–850° C., with the final crystallization being accomplished at temperatures between about 1000°–1200° C. Normally, a nucleation time of about 1–6 hours will be utilized followed by a crystallization growth period of about 4–16 hours. A lengthy crystallization hold is preferred to insure rather complete growth of the secondary crystal phases.

It can be recognized that many modifications in the crystallizing technique is possible. Thus, when the melt is quenched to below the transformation range and concurrently shaped into a glass article, the glass article may be cooled to room temperature permitting visual inspection of glass quality prior to commencing the heat treatment schedule. Nevertheless, where speed in production and fuel economies are of paramount importance, the melt commonly can merely be cooled to a glass shape at a temperature immediately below the transformation range and the heat treatment initiated without delay.

Also, whereas a heat treatment practice utilizing a separate nucleation hold followed by a crystallization step at a higher temperature is to be preferred, a satisfactorily crystallized article can frequently be secured by simply heating the glass article from room temperature or the transformation range to temperatures in the range 1000°–1200° C. and holding within that range for a length of time sufficient to achieve the desired highly crystalline article. It should be recognized, however, that the crystallization developed through this practice may not be as fine-grained as that obtained where a separate nucleation period is utilized.

Furthermore, where a rate of heating above the transformation range is employed which is relatively slow and the final crystallization temperature approaches the hotter extreme of the heat treating range, no dwell period, as such, at any one temperature within the nucleation and crystallization ranges will be required. Nevertheless, inasmuch as the growth of crystals is a function of time and temperature, the rate at which the glass article is heated above the transformation range must not be so rapid that there is insufficient time for the development of adequate crystallization to support the article to occur and the article will, consequently, deform and slump. Therefore, whereas heating rates of 10° C./minute and higher can be utilized successfully, especially where physical supports have been provided for the glass articles to minimize deformation thereof, I prefer to employ heating rates of about 3°–5° C./minute. These heating rates have resulted in articles displaying very little, if any, deformation throughout the whole field of compositions operable in this invention.

Table I records compositions, expressed in weight percent on the oxide basis, of thermally crystallizable glasses which, when subjected to the heat treatment practice of this invention, were crystallized in situ to relatively uniformly fine-grained glass-ceramic articles. The ingredients comprising the glass-forming batches may be any materials, either oxides or other compounds, which, when melted together, are converted to the desired oxide compositions in the desired proportions. $As_2O_3$ is present in its conventional capacity as a fining agent.

The batch ingredients were compounded, ballmilled together to aid in securing a homogeneous melt, and subsequently melted in open platinum crucibles for about 16 hours at temperatures between about 1600°–1700° C. (It will be appreciated that where larger quantities of glass are required, pots or even continuous tanks can be employed as melting units.) Glass cane of about ¼" diameter was hand drawn from each crucible melt and the remainder poured into a steel plate to give a circular patty about 4" in diameter and ⅜" thick. The glass articles were immediately transferred to an annealer operating at about 700° C. After annealing, the glass articles were placed in an electrically-fired furnace and subjected to the heat treatment schedules recited in Table II. At the conclusion of the stated heat treatment, the electric current to the furnace was cut off and the crystallized articles were either removed directly from the furnace into the ambient atmosphere or merely left in the furnace and permitted to cool to room temperature therein. The rate at which the furnace cooled to room temperature (termed "furnace rate") was estimated to average about 3°–5° C./minute.

TABLE I

| | 1 | 2 | 3 | 4 | 5 |
|---|---|---|---|---|---|
| Percent: | | | | | |
| $SiO_2$ | 72.0 | 74.1 | 73.8 | 70.8 | 71.9 |
| $Al_2O_3$ | 17.2 | 15.4 | 15.7 | 17.5 | 17.2 |
| $Li_2O$ | 4.3 | 4.0 | 4.0 | 4.3 | 4.3 |
| $SrO$ | 1.5 | 1.8 | 1.8 | 2.0 | 2.0 |
| $La_2O_3$ | | | | | |
| $TiO_2$ | 4.2 | 3.9 | 3.9 | 4.6 | 3.8 |
| $As_2O_3$ | 0.8 | 0.8 | 0.8 | 0.8 | 0.8 |

| | 6 | 7 | 8 | 9 | 10 |
|---|---|---|---|---|---|
| $SiO_2$ | 71.1 | 72.2 | 68.9 | 70.3 | 71.6 |
| $Al_2O_3$ | 17.6 | 16.8 | 18.8 | 18+0 | 17.1 |
| $Li_2O$ | 4.3 | 4.3 | 4.7 | 4.2 | 4.3 |
| $SrO$ | 2.0 | 2.0 | 2.2 | 2.9 | 1.0 |
| $La_2O_3$ | | | | | 1.0 |
| $TiO_2$ | 4.2 | 3.9 | 4.6 | 3.8 | 4.2 |
| $As_2O_3$ | 0.8 | 0.8 | 0.8 | 0.8 | 0.8 |

| | 11 | 12 | 13 | 14 | 15 |
|---|---|---|---|---|---|
| $SiO_2$ | 72.2 | 74.2 | 72.1 | 71.7 | 72.8 |
| $Al_2O_3$ | 17.3 | 15.8 | 17.2 | 17.6 | 17.0 |
| $Li_2O$ | 4.3 | 4.0 | 4.3 | 4.3 | 4.4 |
| $Y_2O_3$ | 1.1 | 1.3 | 1.4 | 1.4 | 1.5 |
| $TiO_2$ | 4.3 | 3.9 | 4.2 | 4.2 | 3.5 |
| $As_2O_3$ | 0.8 | 0.8 | 0.8 | 0.8 | 0.8 |

| | 16 | 17 | 18 | 19 | 20 |
|---|---|---|---|---|---|
| $SiO_2$ | 72.1 | 69.4 | 70.1 | 71.6 | 71.7 |
| $Al_2O_3$ | 17.3 | 18.9 | 17.8 | 16.2 | 17.2 |
| $Li_2O$ | 4.4 | 4.7 | 4.4 | 4.4 | 4.3 |
| $Y_2O_3$ | 1.5 | 1.6 | 2.2 | 2.2 | 2.2 |
| $TiO_2$ | 3.9 | 4.6 | 4.7 | 4.8 | 3.8 |
| $As_2O_3$ | 0.8 | 0.8 | 0.8 | 0.8 | 0.8 |

| | 21 | 22 | 23 | 24 | 25 |
|---|---|---|---|---|---|
| $SiO_2$ | 68.5 | 71.4 | 71.8 | 69.5 | 73.6 |
| $Al_2O_3$ | 18.8 | 17.1 | 17.2 | 19.1 | 15.8 |
| $Li_2O$ | 4.2 | 4.3 | 4.3 | 4.9 | 4.0 |
| $Y_2O_3$ | 3.2 | 1.4 | 0.7 | | |
| $La_2O_3$ | | | 1.0 | 1.2 | 1.9 |
| $TiO_2$ | 4.5 | 2.8 | 4.2 | 5.3 | 3.9 |
| $ZrO_2$ | | 2.2 | | | |
| $As_2O_3$ | 0.8 | 0.8 | 0.8 | | 0.8 |

| | 26 | 27 | 28 | 29 | 30 |
|---|---|---|---|---|---|
| $SiO_2$ | 71.8 | 72.4 | 68.8 | 68.6 | 69.5 |
| $Al_2O_3$ | 17.2 | 16.8 | 18.8 | 18.9 | 17.7 |
| $Li_2O$ | 4.3 | 4.4 | 4.7 | 4.9 | 4.3 |
| $Y_2O_3$ | | | | | |
| $La_2O_3$ | 2.1 | 2.1 | 2.3 | 2.4 | 3.1 |
| $TiO_2$ | 3.8 | 3.5 | 4.6 | 5.2 | 4.6 |
| $ZrO_2$ | | | | | |
| $As_2O_3$ | 0.8 | 0.8 | 0.8 | | 0.8 |

| | 31 | 32 | 33 | 34 | 35 |
|---|---|---|---|---|---|
| $SiO_2$ | 70.1 | 71.0 | 70.9 | 67.9 | 67.3 |
| $Al_2O_3$ | 17.3 | 17.0 | 16.0 | 18.6 | 18.6 |
| $Li_2O$ | 4.2 | 4.3 | 4.4 | 4.8 | 4.2 |
| $La_2O_3$ | 3.1 | 3.1 | 3.2 | 3.5 | 4.6 |
| $Ta_2O_5$ | | | | | |
| $TiO_2$ | 4.5 | 3.8 | 4.7 | 5.2 | 4.5 |
| $ZrO_2$ | | | | | |
| $As_2O_3$ | 0.8 | 0.8 | 0.8 | | 0.8 |

| | 36 | 37 | 38 | 39 | 40 | 41 | 42 |
|---|---|---|---|---|---|---|---|
| $SiO_2$ | 70.8 | 69.6 | 69.0 | 68.3 | 67.4 | 68.6 | 70.0 |
| $Al_2O_3$ | 17.0 | 19.1 | 19.0 | 18.8 | 19.0 | 17.5 | 15.8 |
| $Li_2O$ | 4.3 | 5.0 | 4.9 | 4.8 | 4.2 | 4.3 | 4.4 |
| $La_2O_3$ | 2.1 | | | | | | |
| $Ta_2O_5$ | | 1.0 | 1.9 | 2.9 | 4.1 | 4.2 | 4.3 |
| $TiO_2$ | 2.8 | 5.3 | 5.2 | 5.2 | 4.5 | 4.6 | 4.7 |
| $ZrO_2$ | 2.2 | | | | | | |
| $As_2O_3$ | 0.8 | | | | 0.8 | 0.8 | 0.8 |

The above-outlined quantities of $SiO_2$, $Al_2O_3$, $Li_2O$, nucleating agent, and modifying metal oxide are mandatory for securing glasses which will resist cracking when crystallized in situ in thick cross-section and, yet, will be transformed upon heat treatment to give a very highly crystalline article, i.e., greater than 75% by weight crystalline, of which at least about 90% comprises beta-spodumene solid solution. The resultant glass-ceramic articles exhibit coefficients of thermal expansion (25°–900° C.) between $0–10\times10^{-7}/°$ C. and excellent creep resistance at temperatures approaching 1000° C. Very minor amounts of compatible metal oxides such as ZnO, BaO, MgO, CaO, $K_2O$ and $Na_2O$ can be tolerated but the total of all such additions should not exceed about 5% by weight.

The presence of SrO, $Y_2O_3$, $La_2O_3$, and/or $Ta_2O_5$ leads to the development of very minor amounts of secondary crystal phases of low coefficient of thermal expansion which appear to impart the improved creep resistance to the final product. Thus, the inclusion of these oxides in the glass compositions serves to perform two wanted functions: (1) reduces the viscosity of the residual glassy phase during the initial crystallization stages; and (2) improves the creep resistance and dimensional stability of the final glass-ceramic article at high temperatures. However, the addition of these oxides in amounts greater than the operable ranges listed above is not only uneconomical from a practical point of view but can adversely affect the overall low expansion coefficient of the product.

Table II records the heat treatment schedule to which each glass article was subjected and Table III provides a visual description of the final crystallized product along with the crystal phases present as determined through X-ray diffraction analyses. In each heat treatment schedule listed below, the temperature of the glass article was raised or lowered to the cited hold at about 200° C./hour.

TABLE II.—Heat Treating Schedules (A)

Heat to 750° C. and hold for 4 hours
Heat to 1100° C. and hold for 2 hours
Lower to 1050° C. and hold for 10 hours
Cool to room temperature at furnace rate.

(B)

Heat to 750° C. and hold for 4 hours
Heat to 1100° C. and hold for 2 hours
Lower to 1050° C. and hold for 4 hours
Cool to room temperature at furnace rate.

(C)

Heat to 780° C. and hold for 2 hours
Heat to 1100° C. and hold for 2 hours
Cool to room temperature at furnace rate.

(D)

Heat to 800° C. and hold for 4 hours
Heat to 1150° C. and hold for 4 hours
Lower to 850° C. and hold for 2 hours
Heat to 1050° C. and hold for 10 hours
Cool to room temperature at furnace rate.

(E)

Heat to 850° C. and hold for 2 hours
Heat to 1000° C. and hold for 2 hours
Heat to 1100° C. and hold for 16 hours
Cool to room temperature at furnace rate.

Heat treating schedule D has been particularly useful in assuring substantial growth of secondary crystal phases such that the final product demonstrates the best creep resistance.

Table III also records several measurements of coefficients of thermal expansion (25°–900° C.) performed in the conventional manner. Finally, creep resistance at 1000° C. was determined in terms of "apparent viscosity" utilizing the beam bending method described by H. E. Hagy, in "Experimental Evaluation of Beam-Bending Method of Determining Glass Viscosities in the Range $10^8$ to $10^{15}$ Poises," Journal of the American Ceramic Society, vol. 46, No. 2, pages 93–97, February 1963.

The "apparent viscosities" determined after a one-hour hold at 1000° C. provide a rapid means of estimating the relative high temperature stability to be expected from a material during prolonged periods of operation Since the beam bending method involves a measurement of sample deformation under an applied load—generally 1500 to 2000 p.s.i.—it cannot directly predict the dimensional change at high temperatures of a material which is not subjected to any applied load. Such measurements are obtained by means of a length comparator test as described by Wilmer Souder and Peter Hidnet. "Measurement of the Thermal Expansion of Fused Silica," "Scientific Papers of the Bureau of Standards, vol. 21, pages 1–23, Sept. 21, 1965. However, experience with the two methods over a period of time demonstrates that materials having superior values of "apparent viscosity" determined by the beam-bending viscosity method also tend to show superior long-term dimensional stability at high temperatures as determined by the length comparator test. For example, a glass-ceramic in the $$Li_2O \cdot BaO \cdot Al_2O_3 \cdot SiO_2 \cdot TiO_2$$

system, as described in United States patent application Ser. No. 765,467, filed Oct. 7, 1968, now Pat. No. 3,582,385, exhibited an "apparent viscosity" of about $1.5 \times 10^{13}$ poises after one hour at 1000° C. Length comparator tests on the same composition indicated length changes of about 50 parts/million after 1000 hours at 800° C. and 215 parts/million after 21,150 hours at 800° C. It will be appreciated that several of the examples in Table III exhibit superior values of "apparent viscosity" and can be expected to exhibit superior dimensional stability.

TABLE III

| Example No. | Heat treatment | Description | Crystal phases | Exp. coeff. ($\times 10^{-7}$/° C.) | Apparent viscosity (poises) |
|---|---|---|---|---|---|
| 1 | A | White, fine-grained | Beta-spodumene s.s., anatase, $SrO \cdot Al_2O_3 \cdot 2SiO_2$ | | |
| 2 | B | do | Beta-spodumene s.s., rutile, $SrO \cdot Al_2O_3 \cdot 2SiO_2$ | 4.4 | |
| 3 | D | White, very fine-grained | Beta-spodumene s.s., anatase, $SrO \cdot Al_2O_3 \cdot 2SiO_2$ | 4.0 | $3.0 \times 10^{13}$ |
| 4 | C | White, fine-grained | Beta-spodumene s.s., rutile, $SrO \cdot Al_2O_3 \cdot 2SiO_2$ | 5.6 | |
| 5 | D | White, very fine-grained | Beta-spodumene s.s., anatase, $SrO \cdot Al_2O_3 \cdot 2SiO_2$ | 3.9 | $2.9 \times 10^{13}$ |
| 6 | A | White, fine-grained | do | | |
| 7 | B | do | Beta-spodumene s.s., rutile, $SrO \cdot Al_2O_3 \cdot 2SiO_2$ | 4.1 | |
| 8 | D | White, very fine-grained | Beta-spodumene s.s., anatase, $SrO \cdot Al_2O_3 \cdot 2SiO_2$ | 6.9 | $2.2 \times 10^{13}$ |
| 9 | A | White, fine-grained | do | | |
| 10 | D | White, very fine-grained | Beta-spodumene s.s., anatase, $SrO \cdot Al_2O_3 \cdot 2SiO_2$, $La_2Ti_2O_7$ | | |
| 11 | A | White, fine-grained | Beta-spodumene s.s., rutile, $Y_2Ti_2O_7$ | | |
| 12 | D | White, very fine-grained | do | 2.2 | $2.8 \times 10^{13}$ |
| 13 | A | White, fine-grained | do | | |
| 14 | A | do | do | | |
| 15 | B | do | do | | |
| 16 | D | White, very fine-grained | do | 3.3 | $3.3 \times 10^{13}$ |
| 17 | D | do | do | 7.9 | $2.6 \times 10^{13}$ |
| 18 | A | White, fine-grained | do | | |
| 19 | E | do | do | | |
| 20 | D | White, very fine-grained | do | 3.3 | |
| 21 | D | do | do | 7.2 | |
| 22 | C | White, fine-grained | Beta-spodumene s.s., rutile, $Y_2Ti_2O_7$, $ZrTiO_4$ | | |
| 23 | A | do | Beta-spodumene s.s., rutile, $La_2Ti_2O_7$, $LaYO_3$ | | |
| 24 | B | do | Beta-spodumene s.s., rutile, $La_2Ti_2O_7$ | | |
| 25 | D | White, very fine-grained | Beta-spodumene s.s., rutile, $La_2Ti_2O_7$, $La_2O_3$ | 3.8 | $4.3 \times 10^{13}$ |
| 26 | D | do | Beta-spodumene s.s., rutile, $La_2Ti_2O_7$, $La_2TiO_5$ | 4.1 | $4.3 \times 10^{13}$ |
| 27 | A | White, fine-grained | Beta-spodumene s.s., rutile, $La_2Ti_2O_7$, $La_2O_3$ | | |
| 28 | D | White, very fine-grained | Beta-spodumene s.s., rutile, $La_2Ti_2O_7$, $La_2TiO_5$ | 7.8 | $4.0 \times 10^{13}$ |

TABLE III—Continued

| Example No. | Heat Treatment | Description | Crystal phases | Exp. coeff. (x10⁻⁷/° C.) | Apparent viscosity (poises) |
|---|---|---|---|---|---|
| 29 | E | White, fine-grained | Beta-spodumene s.s., rutile, La$_2$Ti$_2$O$_7$, La$_2$O$_3$ | | |
| 30 | A | White, very fine-grained | Beta-spodumene s.s., rutile, La$_2$Ti$_2$O$_7$, La$_2$TiO$_5$ | 6.9 | |
| 31 | D | ....do.... | ....do.... | 6.3 | |
| 32 | B | White, fine-grained | Beta-spodumene s.s., rutile, La$_2$Ti$_2$O$_7$, La$_2$O$_3$ | | |
| 33 | C | ....do.... | Beta-spodumene s.s., rutile, La$_2$Ti$_2$O$_7$ | | |
| 34 | D | White, very fine-grained | Beta-spodumene s.s., rutile, La$_2$Ti$_2$O$_7$, La$_2$TiO$_5$ | | |
| 35 | A | White, fine-grained | Beta-spodumene s.s., rutile, La$_2$Ti$_2$O$_7$, La$_2$O$_3$ | 9.4 | |
| 36 | D | White, very fine-grained | Beta-spodumene s.s., rutile, La$_2$Ti$_2$O$_7$, ZrTiO$_4$ | | |
| 37 | A | White, fine-grained | Beta-spodumene s.s., anatase, AlTaO$_4$ | | |
| 38 | B | ....do.... | ....do.... | | |
| 39 | E | ....do.... | Beta-spodumene s.s., rutile, AlTaO$_4$ | 7.5 | |
| 40 | D | White, very fine-grained | ....do.... | | |
| 41 | A | White, fine-grained | ....do.... | | |
| 42 | D | White, very fine-grained | ....do.... | 4.0 | 2.2×10¹⁴ |

Tables I, II, and III clearly illustrate the composition and process parameters which must be observed to produce glass-ceramic articles having the desirable properties of the invention. Heat treatment schedules A and D yield more finely-grained products and are also preferred over a short schedule such as C since the secondary crystal phases are more fully developed resulting in a minimum of residual glass. It will be appreciated that "tailoring" a heat treatment schedule to a specific glass composition will often result in a glass-ceramic with outstanding creep resistance. Thus, Example 27, when heat treated in accordance with the following schedule, yielded a glass-ceramic material exhibiting an "apparent viscosity" of $1.74 \times 10^{14}$ poises:

Heat to 850° C. at 300° C./hour and hold for 2 hours
Heat to 1150° C. at 300° C./hour and hold for 4 hours
Lower to 850° C. and hold for 2 hours
Heat to 1050° C. at 200° C./hour and hold for 10 hours
Cool to room temperature at furnace rate.

Hence, the creep resistance of this product was about an order of magnitude greater than that demonstrated by the product of Serial No. 765,467, supra.

The crystal content of these bodies exceeds 75% by weight and is commonly in excess of 90% by weight, depending upon the heat treatment schedule utilized and the extent to which the components of the batch are adaptable to the formation of crystal phases. The crystals, themselves, are relatively uniformly fine-grained, substantially all being smaller than about 5 microns in diameter and the majority being smaller than 2 microns in diameter.

Based upon the physical properties exhibited, as well as their melting and forming capabilities, Examples 5, 16, 26, 27, and 42 are preferred compositions.

I claim:
1. A white, fine-grained glass-ceramic article exhibiting a coefficient of expansion (25°–900° C.) between about $0-10 \times 10^{-7}$/° C. and excellent creep resistance and dimensional stability at temperatures greater than 800° C. and up to about 1000° C. wherein beta-spodumene solid solution comprises the principal crystal phase and very minor amounts of strontia-, yttria-, lanthana-, and/or tantala-bearing crystal species comprise the secondary crystal phase, said crystals constituting at least 75% by weight of the article and being formed through the crystallization in situ of a glass article consisting essentially, by weight on the oxide basis, of about 65–75% SiO$_2$, 15–20% Al$_2$O$_3$, 3–6% Li$_2$O, 1–6% total of at least one metal oxide in the indicated proportion selected from the group consisting of 1–4% SrO, 1–4% Y$_2$O$_3$, 1–5% La$_2$O$_3$, and 1–5% Ta$_2$O$_5$, and 2–7% RO$_2$, wherein RO$_2$ consists of 2–6% TiO$_2$ and 0–3% ZrO$_2$, the sum of SiO$_2$, Al$_2$O$_3$, Li$_2$O, metal oxide, and RO$_2$ constituting at least 95% by weight of the composition.

References Cited

UNITED STATES PATENTS

| | | | |
|---|---|---|---|
| 3,600,204 | 8/1971 | Beall et al. | 106—39 D V |
| 3,573,939 | 4/1971 | Beall | 106—39 D V |
| 3,578,470 | 5/1971 | Bahat et al. | 106—39 D V |
| 3,582,385 | 6/1971 | Duke et al. | 106—39 D V |
| 3,582,371 | 6/1971 | Bruno et al. | 106—39 D V |

OTHER REFERENCES

Kingery, W. D.: Plastic Deformation, Viscous Flow and Creep, in Introduction to Ceramics; New York, 1960, pp. 575–6.

HELEN M. McCARTHY, Primary Examiner

U.S. Cl. X.R.
65—33; 106—52